(12) United States Patent
Morin

(10) Patent No.: US 7,653,995 B2
(45) Date of Patent: Feb. 2, 2010

(54) WELD REPAIR OF SUPERALLOY MATERIALS

(75) Inventor: James A. Morin, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 403 days.

(21) Appl. No.: 11/497,113

(22) Filed: Aug. 1, 2006

(65) Prior Publication Data

US 2009/0320966 A1 Dec. 31, 2009

(51) Int. Cl.
*B23P 6/00* (2006.01)
*C21D 1/09* (2006.01)
*C22F 1/10* (2006.01)

(52) U.S. Cl. .............. 29/889.1; 29/402.04; 29/402.09; 29/402.16; 148/525; 148/527; 148/565; 148/675; 228/119

(58) Field of Classification Search ............... 148/525, 148/565, 404, 675, 527; 219/121.66, 121.64, 219/121.46; 29/889.1, 402.01–402.21; 228/203
See application file for complete search history.

(56) References Cited

U.S. PATENT DOCUMENTS

| | | | |
|---|---|---|---|
| 4,336,312 A | 6/1982 | Clark et al. | |
| 4,582,548 A * | 4/1986 | Harris et al. | 148/404 |
| 4,804,815 A | 2/1989 | Everett | |
| 4,965,095 A | 10/1990 | Baldi | |
| 5,040,718 A | 8/1991 | Lee et al. | |
| 5,106,010 A | 4/1992 | Stueber et al. | |
| 5,142,778 A | 9/1992 | Smolinski et al. | |
| 5,374,319 A | 12/1994 | Stueber et al. | |
| 5,509,980 A | 4/1996 | Lim | |
| 5,554,837 A | 9/1996 | Goodwater et al. | |
| 5,571,345 A * | 11/1996 | Ganesh et al. | 148/514 |
| 5,732,467 A | 3/1998 | White et al. | |
| 5,785,775 A | 7/1998 | Smashey et al. | |
| 5,897,801 A | 4/1999 | Smashey et al. | |
| 6,084,196 A | 7/2000 | Flowers et al. | |
| 6,120,624 A * | 9/2000 | Vogt et al. | 148/675 |
| 6,191,379 B1 | 2/2001 | Offer et al. | |
| 6,333,484 B1 | 12/2001 | Foster et al. | |
| 6,376,801 B1 | 4/2002 | Farrell et al. | |
| 6,394,971 B1 | 5/2002 | Peterson, Jr. et al. | |
| 6,489,584 B1 | 12/2002 | Kelly | |
| 6,491,207 B1 | 12/2002 | Smashey et al. | |
| 6,495,793 B2 | 12/2002 | Tewari | |
| 6,659,332 B2 | 12/2003 | Smashey et al. | |
| 6,872,912 B1 | 3/2005 | Wos et al | |
| 6,902,617 B2 | 6/2005 | Betz | |
| 6,908,288 B2 | 6/2005 | Jackson et al. | |
| 6,972,390 B2 | 12/2005 | Hu et al. | |
| 2003/0116242 A1 * | 6/2003 | Harrison et al. | 148/675 |
| 2005/0263220 A1 * | 12/2005 | Malley et al. | 148/529 |
| 2006/0042729 A1 * | 3/2006 | Kottilingam et al. | 148/675 |
| 2007/0283560 A1 * | 12/2007 | Malley | 29/889.1 |

OTHER PUBLICATIONS

Donachie, et al, "Superalloys: A Technical Guide", 2002, ASM International, Second Edition, p. 144.*
"CM-247 LC: For turbine blades and vanes."; [online]; [retrieved on May 1, 2006]; 3 pages; Retrieved from http://www.c-mgroup.com/spec_sheets/CM_247.htm; The C-M Group.
"Nickel Base DS: A selection guide to common vacuum melted alloys."; [online]; [retrieved on May 1, 2006]; 1 page; Retrieved from http://www.c-mgroup.com/vacuum_melt_index/nickel_base_ds.htm; The C-M Group.

* cited by examiner

*Primary Examiner*—David P Bryant
*Assistant Examiner*—Sarang Afzali

(57) ABSTRACT

A method of weld repairing a superalloy material at ambient temperature without causing cracking of the base material. A superalloy material such as CM-247 LC, as is commonly used in gas turbine blade applications, is subjected to an overage pre-weld heat treatment in order to grow the volume percentage of gamma prime precipitate in the material to a level sufficient to permit ambient temperature welding without cracking. CM-247 LC material is heated in a vacuum furnace at a rate of about 0.5° C. per minute to an intermediate temperature of about 885° C. The material is then gas fan quenched to a temperature of about 52° C. to grow the gamma prime precipitate percentage to about 55%. A fusion repair weld may then be performed on the material at an ambient temperature using a filler material having a chemistry matching a chemistry of the base material.

14 Claims, No Drawings

WELD REPAIR OF SUPERALLOY MATERIALS

FIELD OF THE INVENTION

This invention relates generally to the field of materials technology, and more particularly to the field of welding of superalloy materials.

BACKGROUND OF THE INVENTION

Nickel-based and cobalt-based superalloy materials are commonly used to provide high mechanical strength for very high temperature applications, such as for the blades or other components of a gas turbine engine. Such components are very expensive, and thus the repair of a damaged part is preferred over its replacement. However, known weld repair techniques for superalloy materials have met with only limited success, due primarily to the propensity of superalloy materials to develop cracks during such welding operations. In addition to hot cracking of the weld filler metal and heat affected zone, these materials exhibit strain age cracking, which results in cracks extending into the base metal of the component.

Several techniques have been proposed to improve the weldability of superalloy materials. U.S. Pat. No. 4,336,312 describes a combination of a controlled chemical modification of a cast nickel-based superalloy material along with a pre-weld thermal conditioning cycle. U.S. Pat. No. 6,364,971 describes a laser welding technique used following a pre-conditioning hot isostatic process. U.S. Pat. No. 6,333,484 describes a welding technique wherein the entire weld area is preheated to a maximum ductility temperature range, and this elevated temperature is maintained during the welding and solidification of the weld. Each of these patents is incorporated by reference herein.

The assignee of the present invention produces gas turbine engines utilizing a variety of materials, including blades formed of a directionally solidified (DS) cast nickel-based superalloy material sold by Cannon-Muskegon Corporation under the designation CM-247 LC. CM-247 LC is known to have the following nominal composition, expressed as weight percentages: carbon 0.07%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel. Such blades are currently repaired by welding at elevated temperatures, so called hot-box welding, utilizing specially selected filler metal. Hot-box weld repairs may take eight hours or more to complete, and the requirement for working inside of the hot box to maintain the elevated temperature makes it difficult to perform such welds robotically.

DETAILED DESCRIPTION OF THE INVENTION

A process is described herein for pre-conditioning a superalloy material so that the material may be welded successfully at ambient temperature conditions without inducing an unacceptable degree of strain age cracks in the base material. One embodiment of this process is described in detail herein for welding the known material described above and designated by Cannon-Muskegon Corporation as CM-247 LC.

The present invention includes a pre-weld conditioning regiment that heats the material from ambient temperature and holds the base material at a predetermined elevated soak temperature for a selected period, then cools the material at a controlled slow rate to a predetermined reduced but still elevated temperature, and then rapidly cools the material to close to ambient temperature. It is believed that the inventive regiment results in the growth of gamma prime to a desired volume percent, thereby providing a degree of ductility to the material that allows it to undergo a fusion welding process at ambient conditions with little or no cracking of the base material.

Some known prior art processes overage a superalloy material at the solution heat treatment temperature (the lowest temperature at which carbides in the material dissolve) prior to welding, such as the process described in U.S. Pat. No. 6,364,971. In contrast, the present invention utilizes a pre-weld conditioning soak temperature that is below the solution heat treatment temperature. For one embodiment of welding CM-247 LC material, a soak temperature of about 2,225° F. (1,218° C.) is used, which is 45° F. (25° C.) below the solution heat treatment temperature for that material of 2,270° F. In other embodiments, the soak temperature may be as much as about 65 or 70 or 75° F. (about 36 or 39 or 42° C.) below the solution heat treatment temperature, or as little as 15 or 20 or 25° F. (about 8 or 11 or 14° C.) below the solution heat treatment temperature, or within a range between any two of those temperatures. The material may be heated in a vacuum furnace with a working pressure of no more than about $2 \times 10^{-3}$ torr in one embodiment, and holding that pressure throughout the heating, soaking and cooling steps. The material may be heated at a rate of about 28±5° F. (about 15±3° C.) per minute (i.e. increasing the temperature of the furnace at that rate), although the heat-up rate has been found not to be critical and may be a different rate so long as it is not so fast as to cause cracking or detrimental distortion of the component formed of the material. The temperature is then maintained at the soak temperature for a time period sufficiently long to allow the elevated temperature to soak the entire thickness of the component, or at least the entire thickness of the component that will be affected by subsequent fusion welding, such as about one hour per inch of thickness for the embodiment of CM-247 LC material.

Upon completion of the heat-up and soak steps, the material is then slowly cooled by cooling the furnace temperature to grow the gamma prime to a desired volume percentage. The material may be cooled at a rate of about 1° F. (about 0.5° C.) per minute to an intermediate temperature that is reduced from the soak temperature but is still above a minimum gamma prime growth temperature of the material. The intermediate temperature may be about 1,625±25° F. (885±14° C.) for the embodiment of CM-247 LC material. The purpose of the slow cool down step is to grow gamma prime to a desired volume percent, such as to about 55%, or at least 40% or 50% or in the range of 40-55% or in the range of 50-55%. The cool down rate may be in the range of 1±0.5° F. (0.5±0.28° C.). The material is then cooled rapidly to a temperature that is below the minimum gamma prime growth temperature of the material, such as by gas fan quench cooling to a temperature of no more than about 300° F. (about 149° C.) or as low as about 125° F. (about 52° C.).

The process described above will produce a material having the desired volume percentage of gamma prime, and will produce a material that can be fusion welded with matching filler material without producing cracking of the base material. This result is unexpected because the described heat treatments do no coincide with any phase diagram reference points or previously used heat treatments. For the embodiment of CM-247 LC material, about two dozen service-run gas turbine engine blades have been successfully repair welded with filler material (Mar-M247) matching the chemistry of the base material at ambient temperature with no cracking, or in a few cases, with only a low degree of cracking of the weld but not the base metal that was not detrimental to the continued use of the component, using the above described process. Conventional pre-process cleaning and post welding solution heat treatment/quench processes are used. Overage heat treatments beyond the ranges specified above have failed to prevent or minimize base metal cracking during blade repair at both elevated temperatures and at ambient temperature. Thus, the inventive process described herein satisfies the long-felt need for a process for successfully weld repairing superalloy material, and in particular for welding such materials at ambient temperatures. Turbine blades have successfully been returned to service in gas turbine engines following a weld repair at ambient temperatures using the process of the present invention; whereas heretofore, repair welds had only been successfully performed at high temperatures.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for repairing a component formed of a superalloy material having the following nominal composition expressed as weight percentages: carbon 0.07%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel, the method comprising:
   heating the component in a vacuum furnace to a soak temperature of 2,225° F.±25° F. at a rate sufficiently slow to avoid cracking of the component;
   allowing the material to soak at the soak temperature;
   cooling the component in the furnace at a rate of 1° F.±0.5° F. per minute to an intermediate temperature of 1,625±25° F.;
   gas fan quenching the component to a temperature of no more than about 300° F.; and
   performing a fusion repair weld on the component at an ambient temperature.

2. The method of claim 1 performing the weld using a filler material having a chemistry matching a chemistry of the superalloy material.

3. The method of claim 1, wherein the heating step further comprises heating the component in a vacuum furnace at a maximum of $2 \times 10^{-3}$ torr pressure.

4. The method of claim 1, wherein the component is a gas turbine engine blade.

5. A method of processing superalloy material, the method comprising:
   heating a superalloy material to a soak temperature of 45° F.±30° F. below a solution heat treatment temperature of the material and allowing the material to soak at the soak temperature;
   cooling the superalloy material from the soak temperature to an intermediate temperature at a rate of 1° F.:1:0.5° F. per minute to grow a volume percentage of gamma prime precipitates in the material to 40-55%;
   quench cooling the superalloy material from the intermediate temperature to a temperature below the minimum gamma prime growth temperature of the material; and
   further comprising performing a fusion welding process on the superalloy material at an ambient temperature after the step of quench cooling;
   wherein the superalloy material is directionally stabilized material having the following nominal composition expressed as weight percentages: carbon 0.07%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel, and wherein the soak temperature is 2,225° F.±25° F.

6. The method of claim 5, further comprising fusion welding the superalloy material with a filler material having a chemistry that matches that of the superalloy material.

7. The method of claim 5 wherein the intermediate temperature is 1,625° F.±25° F.

8. The method of claim 5 wherein the heating step is performed at a rate of 28° F.±5° F. per minute.

9. The method of claim 5 further comprising growing the gamma prime precipitates during the cooling step to about 55%.

10. The method of claim 5 further comprising growing the gamma prime precipitates during the cooling step to within the range of 50-55%.

11. The method of claim 5 wherein the material forms a service-run blade of a gas turbine engine, and further comprising performing a weld repair operation by fusion welding the material at an ambient temperature after the step of quench cooling, and further comprising returning the blade to service in the gas turbine engine after the weld repair.

12. A method for repairing a gas turbine blade formed of a superalloy material having the following nominal composition expressed as weight percentages: carbon 0.7%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel, the method comprising:
   heating the blade in a vacuum furnace at a rate of about 28° F. per minute to a soak temperature of about 2,225° F.;
   allowing the blade to soak at the soak temperature for about an hour;
   cooling the blade in the furnace at a rate of about 1° F. per minute to an intermediate temperature of about 1,625° F.;
   gas fan quenching the blade to a temperature of about 125° F.; and
   performing a fusion repair weld on the blade at an ambient temperature using a filler material having a chemistry matching a chemistry of the superalloy material.

13. The method of claim 12, wherein the cooling step is controlled to grow gamma prime precipitate in the material to a volume percentage of at least 50%.

14. The method of claim 12, wherein the cooling step is controlled to grow gamma prime precipitate in the material to a volume percentage of about 55%.

* * * * *